(12) United States Patent
Yang

(10) Patent No.: US 11,204,525 B2
(45) Date of Patent: Dec. 21, 2021

(54) DISPLAY PANEL AND DISPLAY DEVICE

(71) Applicants: CHONGQING HKC OPTOELECTRONICS TECHNOLOGY CO., LTD., Chongqing (CN); HKC CORPORATION LIMITED, Shenzhen (CN)

(72) Inventor: Chunhui Yang, Chongqing (CN)

(73) Assignees: CHONGQING HKC OPTOELECTRONICS TECHNOLOGY CO., LTD., Chongqing (CN); HKC CORPORATION LIMITED, Shenzhen (CN)

( * ) Notice: Subject to any disclaimer, the term of this patent is extended or adjusted under 35 U.S.C. 154(b) by 458 days.

(21) Appl. No.: 16/311,181

(22) PCT Filed: Oct. 23, 2018

(86) PCT No.: PCT/CN2018/111369
§ 371 (c)(1),
(2) Date: Dec. 19, 2018

(87) PCT Pub. No.: WO2020/051996
PCT Pub. Date: Mar. 19, 2020

(65) Prior Publication Data
US 2021/0231989 A1    Jul. 29, 2021

(30) Foreign Application Priority Data

Sep. 12, 2018 (CN) .................. 201821488362.X

(51) Int. Cl.
*G02F 1/1339* (2006.01)
*G02F 1/1335* (2006.01)
(Continued)

(52) U.S. Cl.
CPC .......... *G02F 1/1339* (2013.01); *G02F 1/1345* (2013.01); *G02F 1/133512* (2013.01); *G02F 1/134309* (2013.01)

(58) Field of Classification Search
None
See application file for complete search history.

(56) References Cited

U.S. PATENT DOCUMENTS

2005/0237469 A1* 10/2005 Kadotani ............ G02F 1/13394
349/155
2008/0239225 A1* 10/2008 Chen ..................... G09G 3/3655
349/139

(Continued)

FOREIGN PATENT DOCUMENTS

CN     101101401 A    1/2008
CN     103941491 A    7/2014
(Continued)

OTHER PUBLICATIONS

Zifan suo, the ISA written comments, Jun. 2019, CN.

*Primary Examiner* — Shan Liu

(57) ABSTRACT

This application discloses a display panel and a display device, the display panel including: a first substrate; a second substrate; and a second common electrode, disposed on the second substrate, where the second common electrode includes an enlarging part, and the display panel includes a support part disposed corresponding to the enlarging part.

14 Claims, 10 Drawing Sheets

(51) Int. Cl.
  *G02F 1/1343*  (2006.01)
  *G02F 1/1345*  (2006.01)

(56) References Cited

U.S. PATENT DOCUMENTS

| | | | |
|---|---|---|---|
| 2009/0109356 A1* | 4/2009 | Kitagawa | G02F 1/134363 |
| | | | 349/33 |
| 2014/0022478 A1* | 1/2014 | Kim | G02F 1/1339 |
| | | | 349/43 |
| 2014/0063420 A1* | 3/2014 | Tsai | G02B 5/201 |
| | | | 349/106 |
| 2014/0146262 A1* | 5/2014 | Yamayoshi | G02F 1/134363 |
| | | | 349/43 |
| 2015/0131018 A1* | 5/2015 | Jeon | G02F 1/136286 |
| | | | 349/42 |
| 2016/0018706 A1 | 1/2016 | Niwano et al. | |
| 2019/0377214 A1* | 12/2019 | Park | G02F 1/1362 |

FOREIGN PATENT DOCUMENTS

| | | |
|---|---|---|
| CN | 104199220 A | 12/2014 |
| CN | 106990593 A | 7/2017 |
| CN | 108319062 A | 7/2018 |

\* cited by examiner

DISPLAY PANEL AND DISPLAY DEVICE

This application claims priority to Chinese Patent Application No. CN201821488362.X, filed with the Chinese Patent Office on Sep. 12, 2018 and entitled "DISPLAY PANEL AND DISPLAY DEVICE", which is incorporated herein by reference in its entirety.

TECHNICAL FIELD

This application relates to the field of display technologies, and in particular, to a display panel and a display device.

BACKGROUND

The description herein provides only background information related to this application, but does not necessarily constitute the existing technology.

Owing to many advantages such as thinness, power saving, and no radiation, liquid crystal displays are widely applied. Most liquid crystal displays on the market are backlight liquid crystal displays. The liquid crystal display includes a liquid crystal panel and a backlight module. The working principle of the liquid crystal panel is: Liquid crystal molecules are placed between two parallel glass substrates, and a drive voltage is applied across the two glass substrates to control rotating directions of the liquid crystal molecules, so that light in the backlight module is refracted out to generate an image. A thin film transistor-liquid crystal display (TFT-LCD) manufacturing process includes an array manufacturing procedure, a color film manufacturing procedure and a liquid crystal cell manufacturing procedure. In the liquid crystal cell manufacturing procedure, in addition to various cleaning procedures, a main manufacturing process includes liquid crystal alignment layer dispensing, liquid crystal dripping, sealant dispensing, vacuum assembling of liquid crystal into a cell, cutting, and the like.

Generally, the sealant dispensing further includes gold ball dispensing. The gold ball dispensing procedure is used for products in a twisted nematic (TN) display mode and a vertical alignment (VA) display mode, and aims to transfer a common voltage of an array substrate to a common electrode of a color film substrate. Gold balls are dispensed at the outer side of a sealant, a common electrode of the array substrate is lead out through a contact hole, and after the gold balls are dispensed, a common potential is transferred to the color film substrate by using a conductive capability of the gold balls. The purpose of the gold ball dispensing procedure is that transparent conductive films on upper and lower substrates are conducted by using the gold balls, so that the common electrode of the array substrate are conducted to the common electrode of the color film substrate.

As TFT-LCDs develop toward a large size, stability of the common electrode on the color film substrate in the color film procedure has an increasing impact on common undesirable crosstalk phenomena. A crosstalk phenomenon of undesirable display occurs especially when a data line is changed.

SUMMARY

This application provides a display panel and a display device added with a capability of a first common electrode of recovering to a set voltage of a reference voltage source when coupling occurs at the first common electrode.

To achieve an objective of this application, this application provides a display panel, formed with a display area and a peripheral area, the display panel comprising:
a first substrate;
a second substrate, disposed opposite to the first substrate;
a liquid crystal layer, sandwiched between the first substrate and the second substrate;
a sealant, formed on the peripheral area, and configured to seal and bond the first substrate and the second substrate;
a first common electrode, disposed on the first substrate; and
a second common electrode, disposed on the second substrate, wherein
the second common electrode comprises wiring parts and an enlarging part, the wiring parts are respectively disposed at two sides of the enlarging part and connected to the enlarging part, and the line width of the enlarging part is greater than the line widths of the wiring parts; the display panel comprises a support part, and the support part is disposed corresponding to the enlarging part and connects the first common electrode and the second common electrode.

To achieve an objective of this application, this application further provides a display panel, formed with a display area and a peripheral area, the display panel comprising:
a first substrate;
a second substrate, disposed opposite to the first substrate;
a liquid crystal layer, sandwiched between the first substrate and the second substrate;
a sealant, formed on the peripheral area, and configured to seal and bond the first substrate and the second substrate;
a first common electrode, disposed on the first substrate; and
a second common electrode, disposed on the second substrate, wherein
the second common electrode comprises wiring parts and an enlarging part, the wiring parts are respectively disposed at two sides of the enlarging part and connected to the enlarging part, and the line width of the enlarging part is greater than the line widths of the wiring parts; the display panel comprises a support part, and the support part is disposed corresponding to the enlarging part and connects the first common electrode and the second common electrode;
the display area comprises a plurality of black pixel areas, the plurality of black pixel areas is evenly distributed in the display area, and the enlarging part is disposed corresponding to the black pixel areas:
the black pixel area comprises and does not comprise only one support part, and each of the support part is disposed at a position that is at a distance greater than or equal to one thousandth of the horizontal length and the vertical width of the support display area to a boundary of the display area in horizontal and vertical directions;
the support part comprises conductive metal balls, the conductive metal balls are sandwiched between the first common electrode and the second common electrode; and the second substrate comprises a passivation layer for protecting the second common electrode, and the passivation layer is formed on the second common electrode;
a via hole is provided at a position on the passivation layer corresponding to the second common electrode, and the conductive metal balls are in communication with the first common electrode and the second common electrode through the via hole;
the enlarging part is disposed corresponding to the black pixel areas, and the conductive metal balls are disposed on the enlarging part;

the second substrate comprises a transparent conductive film, the transparent conductive film is formed on the passivation layer, the transparent conductive film is disposed corresponding to the enlarging part, and the transparent conductive film is electrically connected to the second common electrode through the via hole;

the second substrate comprises a plurality of data lines and a plurality of scanning lines, the data lines are distributed in parallel at an interval, the scanning lines are distributed in parallel at an interval, the data lines are disposed perpendicular to the scanning lines, the black pixel area is located in a rectangular area enclosed by two neighboring data lines and two neighboring scanning lines, the enlarging part is disposed corresponding to the rectangular area, and the cross-section of the enlarging part is rectangular;

the first substrate comprises a first alignment film, the first alignment film is close to the liquid crystal layer, the second substrate comprises a second alignment film, the second alignment film is close to the liquid crystal layer, and positions that are on the first alignment film and the second alignment film and that correspond to the conductive metal balls are removed; and a black shielding layer is disposed on the first substrate, the black shielding layer comprises a first black shielding layer, and the first black shielding layer is disposed corresponding to the black pixel areas.

To achieve the objective of this application, this application further provides a display device, comprising any one of the foregoing display panels and a drive circuit for driving the display panels.

In this application, the support parts are disposed in the plurality of evenly distributed black pixel areas on the display panel, so that the first common electrode and the second common electrode are connected and conducted in the display area, and a conduction path is greatly shortened. In addition, a part of the second common electrode in the black pixel areas is made into an enlarging part having a large area, and thus, on the enlarging part, the quantity of the support parts may be increased, so that there is a plurality of circuits connected in parallel between the first common electrode and the second common electrode. The circuits connected in parallel are equivalent to that the first common electrode having a relatively large resistance value is divided into a plurality of electrodes having a small resistance value, and voltages at voltage sources of the second common electrode and the first common electrode are set as the same. Moreover, the second common electrode uses metal for conduction and has relatively small capacitive coupling. Therefore, when the second common electrode is in conduction to the first common electrode, on the first common electrode, there is a plurality of points evenly radiating, so that potentials on the second common electrode can be rapidly and evenly conducted to the first common electrode, and a capability of the first common electrode recovering to a predetermined potential due to capacitive coupling can be greatly enhanced. According to the foregoing advantages, when the data line is changed, the capability of the first common electrode of recovering to a set voltage of a reference voltage source when coupling occurs at the first common electrode is enhanced, thereby avoiding a crosstalk phenomenon.

BRIEF DESCRIPTION OF DRAWINGS

The accompanying drawings included are used to provide an understanding of the embodiments of this application. The accompanying drawings constitute a part of the specification, illustrate examples of implementations of this application, and explain the principle of this application together with the text description. Obviously, the accompanying drawings in the following description are merely some embodiments of this application. For a person of ordinary skill in the art, the person may obtain other drawings according to these accompanying drawings without creative efforts. In the figures.

DETAILED DESCRIPTION

Figure 1:
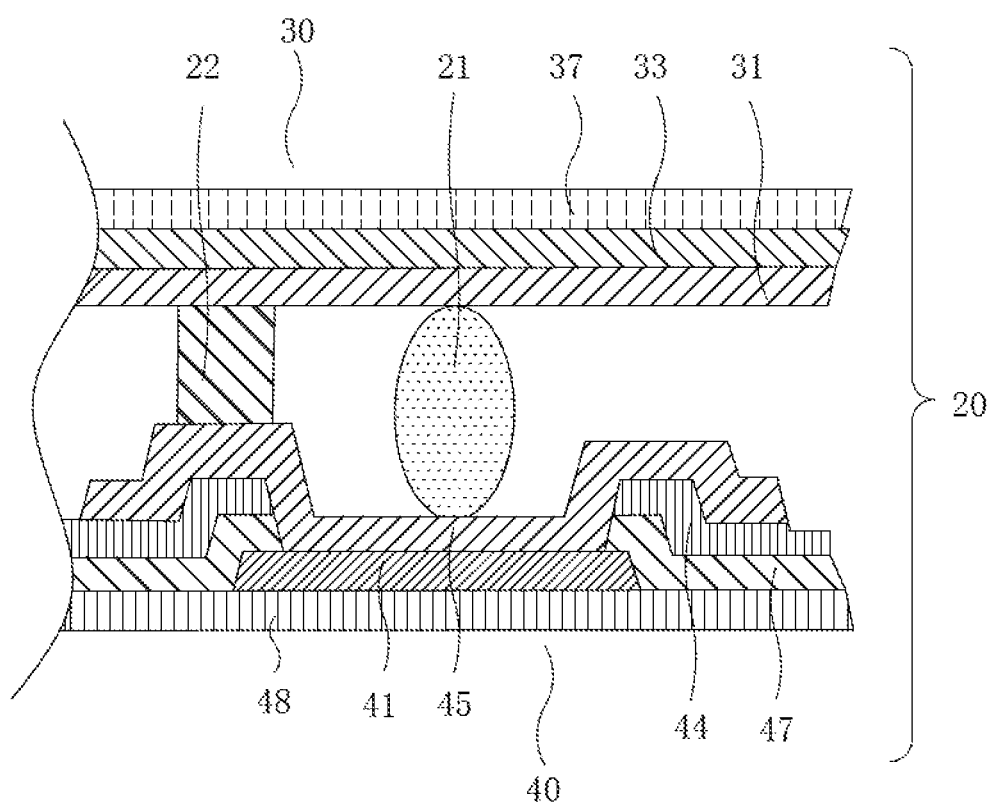
FIG. 1 is a schematic structural diagram of an exemplary display panel.

Specific structures and functional details disclosed herein are merely representative, and are intended to describe the objectives of the exemplary embodiments of this application. However, this application may be specifically implemented in many alternative forms, and should not be construed as being limited to the embodiments set forth herein.

In the description of this application, it should be understood that orientation or position relationships indicated by the terms such as "center", "transverse", "on", "below", "left", "right", "vertical", "horizontal", "top", "bottom", "inside", and "outside" are based on orientation or position relationships shown in the accompanying drawings, and are used only for ease and brevity of illustration and description, rather than indicating or implying that the mentioned apparatus or component must have a particular orientation or must be constructed and operated in a particular orientation. Therefore, such terms should not be construed as limiting of this application. In addition, the terms such as "first" and "second" are used only for the purpose of description, and should not be understood as indicating or implying the relative importance or implicitly specifying the number of the indicated technical features. Therefore, a feature defined by "first" or "second" can explicitly or implicitly include one or more of said features. In the description of this application, unless otherwise stated, "a plurality of" means two or more than two. In addition, the terms "include", "comprise" and any variant thereof are intended to cover non-exclusive inclusion.

In the description of this application, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. Persons of ordinary skill in the art may understand the specific meanings of the foregoing terms in this application according to specific situations.

The terminology used herein is for the purpose of describing specific embodiments only and is not intended to be limiting of exemplary embodiments. As used herein, the singular forms "a", "an" and "the" are intended to include the plural forms as well, unless the context clearly indicates otherwise. It should be further understood that the terms "include" and/or "comprise" when used in this specification, specify the presence of stated features, integers, steps, operations, elements, and/or components, but do not preclude the presence or addition of one or more other features, integers, steps, operations, elements, components, and/or combinations thereof.

In figures, units of similar structures are represented by using a same reference number.

Referring to FIG. 1 to FIG. 11, in an embodiment of this application, this application discloses a display panel 1, formed with a display area 10 and a peripheral area 20, the display panel 1 including:

a first substrate 30; a second substrate 40, disposed opposite to the first substrate 30; a liquid crystal layer 50, sandwiched between the first substrate 30 and the second substrate 40; a sealant 22, formed on the peripheral area 20, and configured to seal and bond the first substrate 30 and the second substrate 40; a first common electrode 32, disposed on the first substrate 30; and a second common electrode 41, disposed on the second substrate 40, where the second common electrode 41 includes wiring parts 411 and an enlarging part 412, the wiring parts 411 are respectively disposed at two sides of the enlarging part 412 and connected to the enlarging part 412, and the line width of the enlarging part 412 is greater than the line widths of the wiring parts 411; the display panel 1 includes a support part 31, and the support part 31 is disposed corresponding to the enlarging part 412 and connects the first common electrode 32 and the second common electrode 41.

Specifically, the first substrate 30 is a color film substrate, the second substrate 40 is an array substrate, the first common electrode 32 is a common electrode disposed on the color film substrate, and the second common electrode 41 is a common electrode disposed on the array substrate.

In this application, the support part 31 is disposed on the display panel 1, and the first common electrode 32 is connected and conducted to the second common electrode 41 through the support part 31, so that the first common electrode 32 is electrically connected to the second common electrode 41. Moreover, the line width of the exemplary second common electrode 41 is narrow, and there is a limited area capable for the second common electrode 41 to be in contact with the support part 31, and consequently, it is not helpful to implement a stable and electrical connection between the second common electrode 41 and the first common electrode 32. In this application, the enlarging part 412 having a relatively large line width is disposed on the second common electrode 41, and the support part 31 is disposed corresponding to the enlarging part 412, so that a contactable area of the second common electrode 41 is enlarged, and it is helpful to implement a stable and electrical connection between the second common electrode 41 and the first common electrode 32.

In an embodiment, the display area 10 includes a plurality of black pixel areas 11, the plurality of the black pixel areas 11 is evenly distributed in the display area 10, and the enlarging part 412 is disposed corresponding to the black pixel areas 11.

The display area 10 includes the plurality of evenly distributed black pixel areas 11, and the enlarging part 412 is disposed corresponding to the black pixel areas 11. This means that there is a plurality of lines connected in parallel by using which the first common electrode 32 is conducted to the second common electrode 41, so that there is a plurality of electrical connecting points on the first common electrode 32, when a data line 42 is changed, an electrical signal has a plurality of radiation points on the first common electrode 32, and a capability of the first common electrode 32 recovering to a set voltage of a reference voltage source when coupling occurs at the first common electrode 32 is enhanced. The black pixel areas 11 are evenly distributed in the display area 10, so that the electrical connecting points on the first common electrode 32 are evenly distributed, and when the data line 42 is changed, the electrical signal is evenly conducted at the radiation points on the first common electrode 32, a conduction speed is increased, and the capability of the first common electrode 32 recovering to the set voltage of the reference voltage source when coupling occurs at the first common electrode 32 is enhanced.

In an embodiment, the support part 31 includes conductive metal balls 21, the conductive metal balls 21 are disposed between the first common electrode 32 and the second common electrode 41, the second substrate 40 includes a passivation layer 44 for protecting the second common electrode 41, and the passivation layer 44 is formed on the second common electrode 41.

A via hole 441 is provided at a position on the passivation layer 44 corresponding to the second common electrode 41, and the conductive metal balls 21 are in communication with the first common electrode 32 and the second common electrode 41 through the via hole 441.

Specifically, the conductive metal balls 21 may be gold balls or balls of other conductive materials.

The applicant finds in a study that in a working process of the display panel 1, a potential of the second common electrode 41 is conducted to the first common electrode 32 by setting that conductive gold balls in a sealant is connected to the first common electrode 32 and the second common electrode 41. For a large-size display panel 1, when the data line 42 is changed, a potential of the first common electrode 32 is affected by the data line 42 and a parasitic capacitance of the first common electrode 32. Moreover, the first common electrode 32 is generally formed by a transparent conductive film 45 which has a relatively large resistance and the conductive gold balls in the sealant have a long conductive transmission path, and in this case, a voltage of the first common electrode 32 cannot recover to the set voltage of the reference voltage source in a short time, and a crosstalk phenomenon of undesirable display occurs.

The conductive metal balls 21 are disposed between the first common electrode 32 and the second common electrode 41. The conductive metal balls 21 may be in the display area 10 or in the display area 10 and a peripheral area 20, so that the first common electrode 32 and the second common electrode 41 are in direct communication in the display area 10 or in the display area 10 and the peripheral area 20, and a conductive path is shortened. Moreover, the conductive metal balls 21 correspond to the enlarging part 412, and after the area of the enlarging part 412 is enlarged, the enlarging part 412 can accommodate a larger quantity of the conductive metal balls 21. Therefore, it is helpful to implement multiline conduction between the second common electrode 41 and the first common electrode 32, and the first common electrode 32 having a large resistance value is equivalent to be divided into a plurality of small electrodes with a small resistance. In addition, voltages set at voltage sources of the second common electrode 41 and the first common electrode 32 are set as the same. Moreover, the second common electrode 41 uses metal for conduction and has relatively small capacitive coupling. Therefore, when the second common electrode 41 is in conduction to the first common electrode 32, a capability of the first common electrode 32 recovering to a predetermined potential due to capacitive coupling can be enhanced. According to the foregoing two points, when the data line 42 is changed, the capability of the first common electrode 32 of recovering to a set voltage of a reference voltage source when coupling occurs at the first common electrode 32 is enhanced, thereby avoiding a crosstalk phenomenon.

The passivation layer 44 on the second common electrode 41 is used for protecting the second common electrode 41. However, the passivation layer 44 is an insulator and non-conductive, so that if the conductive metal balls 21 need to connect the first common electrode 32 and the second common electrode 41, the passivation layer 44 needs to be conducted first to expose the second common electrode 41. Therefore, the via hole 441 is provided on the passivation layer 44, so that the conductive metal balls 21 may be in contact with the exposed second common electrode 41 through the via hole 441, and thus the first common electrode 32 and the second common electrode 41 are connected.

In an embodiment, the second substrate 40 includes a transparent conductive film 45. The transparent conductive film 45 is formed on the passivation layer 44, the transparent conductive film 45 is disposed corresponding to the enlarging part 412, the transparent conductive film 45 is electrically connected to the second common electrode 41 through the via hole 441, and the conductive metal balls 21 are disposed on the transparent conductive film 45.

When there is the transparent conductive film 45 corresponding to the enlarging part 412 on the passivation layer 44, the conductive metal balls 21 are first in contact with the transparent conductive film 45 on the side of the second substrate 40. To make sure that the first common electrode 32 is electrically connected to the second common electrode 41, the transparent conductive film 45 is electrically connected to the second common electrode 41. In a manufacturing procedure of the passivation layer 44, the through via hole 441 is provided on the passivation layer 44, and the transparent conductive film 45 is deposited at the position of the via hole 441 in a deposition procedure, so that the transparent conductive film 45 is electrically connected to the second common electrode 41 through the via hole 441. In addition, the second common electrode 41 generally uses metal for signal conduction. The transparent conductive film 45 is thin and may be impaled, namely, there is a risk that the conductive metal balls 21 may squeeze a bottom layer of the transparent conductive film 45. In this case, it is not helpful to implement conduction of transparent conductive films 45 on upper and lower substrates to the first common electrode 32. Therefore, the line width of the enlarging part 412 is made large, so that an area in which the second common electrode 41 may be in contact with the transparent conductive film 45 is enlarged. In this design, the foregoing problems can be avoided and the first common electrode 32 is conducted to the second common electrode 41.

In an embodiment, the second substrate 40 includes a plurality of data lines 42 and a plurality of scanning lines 43, the data lines 42 are distributed in parallel at an interval, the scanning lines 43 are distributed in parallel at an interval, the data lines 42 and the scanning lines 43 are disposed perpendicular to each other, the black pixel area 11 is located in a rectangular area 12 enclosed by two neighboring data lines 42 and two neighboring scanning lines 43, the enlarging part 412 is disposed corresponding to the rectangular area 12, and the cross-section of the enlarging part 412 is rectangular.

Specifically, the cross-section of the enlarging part 412 may be a circle or in other shapes.

The rectangular area 12 is enclosed by two neighboring data lines 42 and two neighboring scanning lines 43. The enlarging part 412 is disposed corresponding to the rectangular area 12. The enlarging part 412 is designed to be rectangular, so that a gap space enclosed by the scanning lines 43 and the data lines 42 can be better used. Therefore, the enlarging part 412 may be made into a relatively large area, an area in which the enlarging part 412 is in contact with the transparent conductive film 45 is increased, the transparent conductive film 45 can be electrically connected better, a stable connection between the transparent conductive film 45 and the second common electrode 41 is ensured, and moreover, the transparent conductive film 45 can be better supported. Compared with a circle or other shapes, a rectangular enlarging part 412 enables the second common electrode 41 to have more areas to be connected to transparent conductive films 45 that are distributed in a horizontal direction and a vertical direction on an upper layer.

In an embodiment, a black shielding layer 33 is disposed on the first substrate 30, the black shielding layer 33 includes a first black shielding layer 331, and the first black shielding layer 331 is disposed corresponding to the black pixel areas 11.

After the support part 31 is disposed on the black pixel area 11, the black pixel area 11 has a light leakage phenomenon when working on the display panel 1, which affects a display effect of the display panel 1. For this reason, a position corresponding to the black pixel area 11 needs to be shielded, and the black shielding layer 33 is disposed on the first substrate 30. The first black shielding layer 331 on the black shielding layer 33 corresponds to the black pixel areas 11, so that the black pixel areas 11 can be accurately shielded, thereby avoiding affecting the display effect of the display panel 1.

In this embodiment, optionally, the first substrate 30 includes a first alignment film 36, the first alignment film 36 is close to the liquid crystal layer 50, the second substrate 40 includes a second alignment film 46, the second alignment film 46 is close to the liquid crystal layer 50, and positions that are on the first alignment film 36 and the second alignment film 46 and that correspond to the support part 31 are removed.

The first alignment film 36 is disposed on a surface of the first substrate 30 close to the liquid crystal layer 50, and the second alignment film 46 is disposed a surface of the second substrate 40 close to the liquid crystal layer 50. The first alignment film 36 and the second alignment film 46 are used for adjusting the direction of the liquid crystal layer 50. In an area in which the support part 31 is disposed, the support part 31 replaces liquid crystal molecules, and an alignment film is not required in this area. More importantly, both the first alignment film 36 and the second alignment film 46 are insulators, the first alignment film 36 is located between the first common electrode 32 and the liquid crystal layer 50, and the second alignment film 46 is located between the second common electrode 41 and the liquid crystal layer 50. For the purpose that the support part 31 connects the first common electrode 32 and the second common electrode 41, areas of the first alignment film 36 and the second alignment film 46 corresponding the support part 31 are removed.

In an embodiment, the black pixel area 11 includes and does not include only one support part 31, and each of the support part 31 is disposed at a position that is at a distance greater than or equal to one thousandth of the horizontal length and the vertical width of the display area 10 to a boundary of the display area 10 in horizontal and vertical directions.

The support part 31 is disposed corresponding to the black pixel areas 11, and there is more than one support part 31 of the black pixel areas 11, ensuring that the first common electrode 32 can be electrically connected to the second common electrode 41, and a plurality of connecting lines can be formed, thereby facilitating electrical conduction. If each position of the support parts 31 has a distance less than one thousandth of the horizontal length and the vertical width of the display area to the boundary of the display area 10, which causes that the support part 31 is only distributed at the boundary of the display area 10 and close to the sealant 22, there is still a long line for which the first common electrode 32 is electrically connected to the second common electrode 41, and it is not helpful for the first common electrode 32 to rapidly recover to the set voltage of the reference voltage source when coupling occurs at the first common electrode 32. Therefore, each position of the support part 31 should have a distance greater than or equal to one thousandth of the horizontal length and the vertical width of the display area 10 to the boundary of the display area 10 in the horizontal direction and the vertical direction.

In another embodiment of this application, referring to FIG. 8 to FIG. 11, different from the foregoing embodiments, the support part 31 is disposed on the first substrate 30, the first common electrode 32 covers the support part 31, and the first common electrode 32 is electrically connected to the second common electrode 41 through the support part 31.

The support part 31 is disposed on the first substrate 30, the support part 31 covers the first common electrode 32, and the first common electrode 32 is in direct connection and communication to the second common electrode 41 through the support part 31, so that a conduction path is greatly reduced. Moreover, the line width of the enlarging part 412 is made wider than that of the wiring part 411, and the support part 31 is disposed corresponding to the enlarging part 412, so that an area in which the first common electrode 32 is in contact with the second common electrode 41 is enlarged, and an electrical connection between the first common electrode 32 and the second common electrode 41 is more stable. Based on the two points described above, when the second common electrode 41 is conducted to the first common electrode 32, the capability of the first common electrode 32 of recovering to the preset potential due to capacitive coupling is enhanced.

In an embodiment, the first substrate 30 includes a black Shielding layer 33, and the support part 31 and the black shielding layer 33 are manufactured by using a same procedure.

The support part 31 and the black shielding layer 33 are manufactured by using a same procedure, so that manufacturing procedures of the support part 31 can be reduced, thereby saving production costs.

In an embodiment, the first substrate 30 includes a color photoresist layer 34, the color photoresist layer 34 includes a first color resist layer 341, a second color resist layer 342 and a third color resist layer 343, and the support part 31 includes any one of the first color resist layer 341, the second color resist layer 342 and the third color resist layer 343 or a combination thereof.

The support part 31 includes any one of the first color resist layer 341, the second color resist layer 342 and the third color resist layer 343 or a combination thereof. Therefore, in a production process of the display panel 1, the support part 31 may be manufactured by using a same manufacturing procedure as that of the color photoresist layer 34, so that the manufacturing procedures of the support part 31 can be reduced, thereby saving production costs.

In an embodiment, a spacing unit 35 is disposed on the first substrate 30, and the support part 31 and the spacing unit 35 are manufactured by using a same procedure.

The spacing unit 35 is used for supporting the first substrate 30 and the second substrate 40. The support part 31 and the spacing unit 35 are manufactured by using a same procedure. Therefore, on the basis that the first common electrode 32 is electrically connected to the second common electrode 41, the support part 31 may further be used for supporting the first substrate 30 and the second substrate 40.

In an embodiment, the support part 31 is formed by stacking at least two of the black shielding layer 33, the color photoresist layer 34 and the spacing unit 35.

The support part 31 is formed by stacking at least two of the black shielding layer 33, the color photoresist layer 34 and the spacing unit 35, and in this way, the manufacturing procedures of the support part 31 can also be reduced, thereby saving the production costs.

Specifically, the support part 31 may be the conductive metal balls 21, or formed by any one or more of the black shielding layer 33 covered by the first common electrode 32, the color photoresist layer 34, a layer formed by stacking the first color resist, the second color resist and the third color resist, and the spacing unit 35, or may alternatively be a combination of the conductive gold balls and the support part 31 covered with the first common electrode 32.

Referring to FIG. 1 to FIG. 7, in another embodiment of this application, a display panel 1 formed with a display area 10 and a peripheral area 20 is disclosed, the display panel 1 including:

a first substrate 30; a second substrate 40, disposed opposite to the first substrate 30; a liquid crystal layer 50, sandwiched between the first substrate 30 and the second substrate 40; and a sealant 22, formed on the peripheral area 20, and configured to seal and bond the first substrate 30 and the second substrate 40, where the second common electrode 41 includes wiring parts 411 and an enlarging part 412, the wiring parts 411 are respectively disposed at two sides of the enlarging part 412 and connected to the enlarging part 412, and the line width of the enlarging part 412 is greater than the line widths of the wiring parts 411; the display panel 1 includes a support part 31, and the support part 31 is disposed corresponding to the enlarging part 412 and connects the first common electrode 32 and the second common electrode 41;

the display area 10 includes a plurality of black pixel areas 11, the plurality of the black pixel areas 11 is evenly distributed in the display area 10, and the enlarging part 412 is disposed corresponding to the black pixel areas 11;

the black pixel area 11 includes and does not include only one support part 31, and each of the support part 31 is disposed at a position that is at a distance greater than or equal to one thousandth of the horizontal length and the vertical width of the display area 10 to a boundary of the display area 10 in horizontal and vertical directions;

the support part 31 includes conductive metal balls 21, the conductive metal balls 21 are disposed between the first common electrode 32 and the second common electrode 41, the second substrate 40 includes a passivation layer 44 for protecting the second common electrode 41, and the passivation layer 44 is formed on the second common electrode 41;

a via hole 441 is provided at a position on the passivation layer 44 corresponding to the second common electrode 41, and the conductive metal balls 21 are in communication with the first common electrode 32 and the second common electrode 41 through the via hole 441;

the enlarging part 412 is disposed corresponding to the black pixel areas 11, and the conductive metal balls 21 are disposed on the enlarging part 412;

the second substrate 40 includes a transparent conductive film 45, the transparent conductive film 45 is formed on the passivation layer 44, the transparent conductive film 45 is disposed corresponding to the enlarging part 412, and the transparent conductive film 45 is electrically connected to the second common electrode 41 through the via hole 441;

the second substrate 40 includes a plurality of data lines 42 and a plurality of scanning lines 43, the data lines 42 are distributed in parallel at an interval, the scanning lines 43 are distributed in parallel at an interval, the data lines 42 and the scanning lines 43 are disposed perpendicular to each other, the black pixel area 11 is located in a rectangular area 12 enclosed by two neighboring data lines 42 and two neighboring scanning lines 43, the enlarging part 412 is disposed corresponding to the rectangular area 12, and the cross-section of the enlarging part 412 is rectangular;

the first substrate 30 includes a first alignment film 36, the first alignment film 36 is close to the liquid crystal layer 50, the second substrate 40 includes a second alignment film 46, the second alignment film 46 is close to the liquid crystal layer 50, and positions that are on the first alignment film 36 and the second alignment film 46 and that correspond to the conductive metal balls 21 are removed; and a black shielding layer 33 is disposed on the first substrate 30, the black shielding layer 33 includes a first black shielding layer 331, and the first black shielding layer 331 is disposed corresponding to the black pixel areas 11.

Specifically, the first substrate 30 is a color film substrate, the second substrate 40 is an array substrate, the first common electrode 32 is a common electrode disposed on the color film substrate, and the second common electrode 41 is a common electrode disposed on the array substrate. The conductive metal balls 21 may be gold balls or balls of other conductive materials.

In this application, the support parts 31 are disposed in the plurality of evenly distributed black pixel areas 11 on the display panel 1, so that the first common electrode 32 and the second common electrode 41 are connected and conducted in the display area 10, and a conduction path is greatly shortened. In addition, a part of the second common electrode 41 in the black pixel areas 11 is made into an enlarging part 412 having a large area, and thus, on the enlarging part 412, the quantity of the support parts 31 may be increased, so that there is a plurality of circuits connected in parallel between the first common electrode 32 and the second common electrode 41. The circuits connected in parallel are equivalent to that the first common electrode 32 having a relatively large resistance value is divided into a plurality of electrodes having a small resistance value, and voltages at voltage sources of the second common electrode 41 and the first common electrode 32 are set as the same. Moreover, the second common electrode 41 uses metal for conduction and has relatively small capacitive coupling. Therefore, when the second common electrode 41 is in conduction to the first common electrode 32, on the first common electrode 32, there is a plurality of points evenly radiating, so that potentials on the second common electrode 41 can be rapidly and evenly conducted to the first common electrode 32, and a capability of the first common electrode 32 recovering to a preset potential due to capacitive coupling can be greatly enhanced. According to the foregoing advantages, when the data line 42 is changed, the capability of the first common electrode 32 of recovering to a set voltage of a reference voltage source when coupling occurs at the first common electrode 32 is enhanced, thereby avoiding a crosstalk phenomenon.

In another embodiment of this application, referring to FIG. 8 to FIG. 11, a manufacturing process of a display panel 1 is disclosed. The manufacturing process includes a manufacturing process of a first substrate 30 and a manufacturing process of a second substrate 40.

Figure 8:
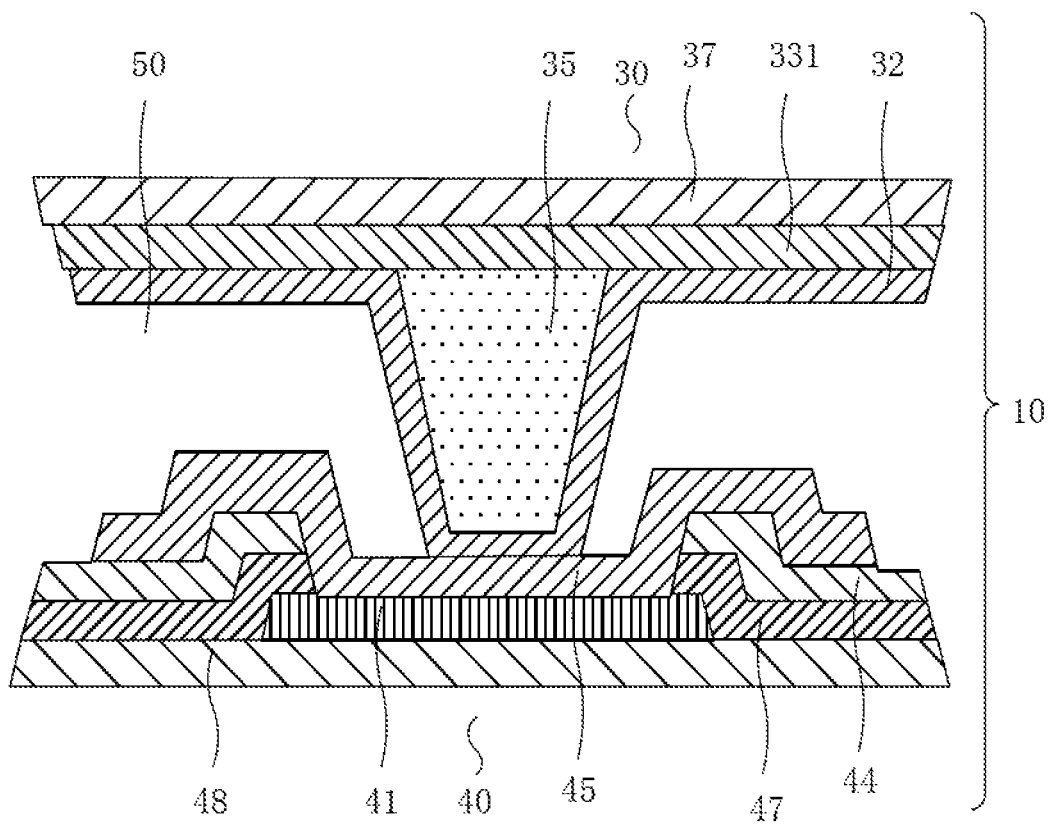
FIG. 8 is a schematic structural diagram (2) of a display panel according to an embodiment of this application.

Referring to FIG. 8, the manufacturing process of the first substrate 30 includes:

forming a black shielding layer 33 on a first glass baseboard 37;

a manufacturing procedure of a first color resist layer 341;

a manufacturing procedure of a second color resist layer 342;

a manufacturing procedure of a third color resist layer 343, where specifically, each of the first color resist layer 341, the second color resist layer 342 and the third color resist layer 343 is any one of a red color resistance, a green color resistance and a blue color resistance, and the first color resist layer 341, the second color resist layer 342 and the third color resist layer 343 are different in color;

a manufacturing procedure of a spacing unit 35, where a support part 31 and the spacing unit 35 are manufactured by using a same procedure;

a manufacturing procedure of a first common electrode 32; and a manufacturing procedure of a first alignment film 36.

Figure 9:
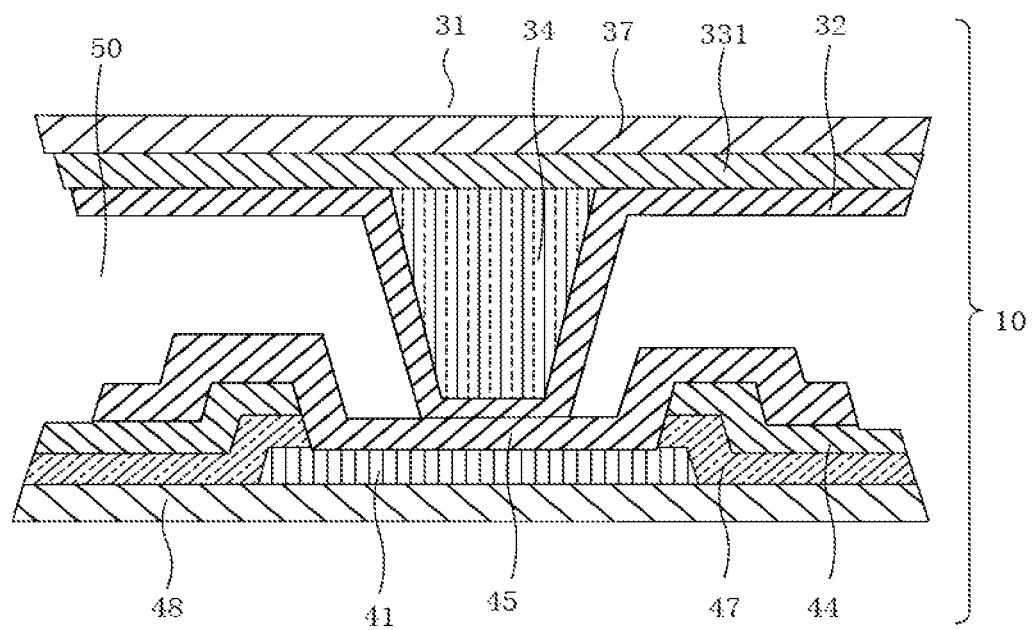
FIG. 9 is a schematic structural diagram (3) of a display panel according to an embodiment of this application.

Referring to FIG. 9, the manufacturing process of the first substrate 30 further includes:

forming a black shielding layer 33 on a first glass baseboard 37;

a manufacturing procedure of a first color resist layer 341;

a manufacturing procedure of a second color resist layer 342; and a manufacturing procedure of a third color resist layer 343, where specifically, a support part 31 and the first color resist layer 341 or the second color resist layer 342 or the third color resist layer 343 are manufactured by using a same procedure; and each of the first color resist layer 341, the second color resist layer 342 and the third color resist layer 343 is any one of a red color resistance, a green color resistance and a blue color resistance, and the first color resist layer 341, the second color resist layer 342 and the third color resist layer 343 are different in color;

a manufacturing procedure of a first common electrode 32;

a manufacturing procedure of a spacing unit 35;

a manufacturing procedure of a transparent conductive film 45; and a manufacturing procedure of a first alignment film 36.

Figure 10:
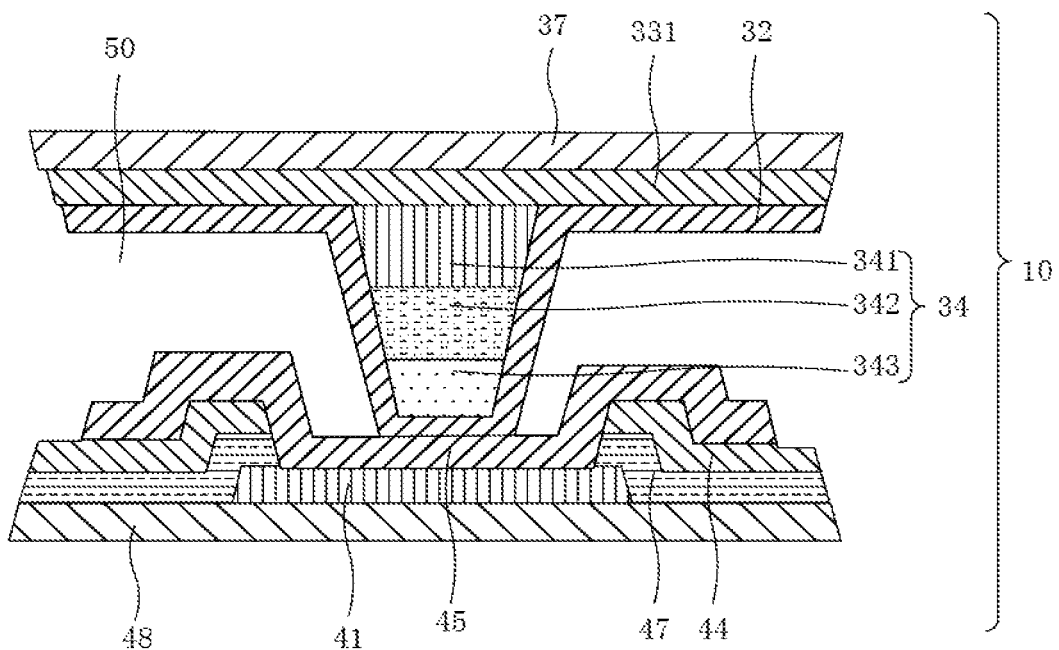
FIG. 10 is a schematic structural diagram (4) of a display panel according to an embodiment of this application.

Referring to FIG. 10, the manufacturing process of the first substrate 30 further includes:

forming a black shielding layer 33 on a first glass baseboard 37;

a manufacturing procedure of a first color resist layer 341;

a manufacturing procedure of a second color resist layer 342; and a manufacturing procedure of a third color resist layer 343, where specifically, a support part 31 and a color photoresist layer 34 are simultaneously manufactured by using a same procedure, and the support part 31 is formed by stacking the first color resist layer 341, the second color resist layer 342 and the third color resist layer 343; and each of the first color resist layer 341, the second color resist layer 342 and the third color resist layer 343 is any one of red color resistance, green color resistance, blue color resistance, and the first color resist layer 341, the second color resist layer 342 and the third color resist layer 343 are different in color;

a manufacturing procedure of a first common electrode 32;

a manufacturing procedure of a spacing unit 35;

a manufacturing procedure of a transparent conductive film 45; and a manufacturing procedure of a first alignment film 36.

Figure 11:
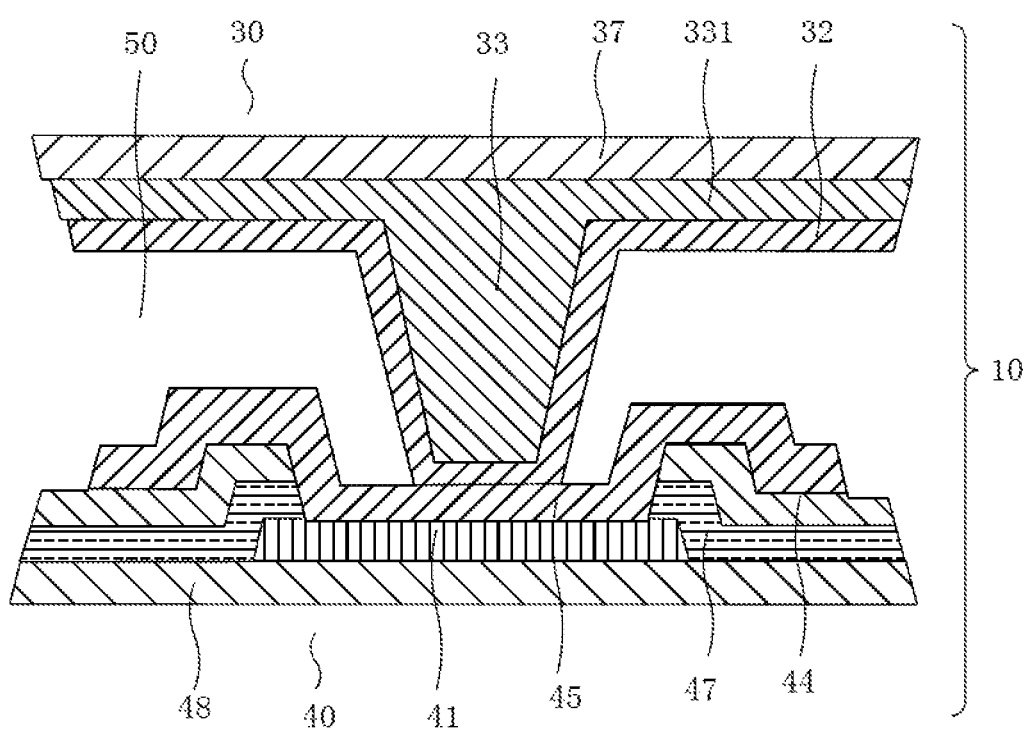
FIG. 11 is a schematic structural diagram (5) of a display panel according to an embodiment of this application.

Referring to FIG. 11, the manufacturing process of the first substrate 30 further includes:

forming a black shielding layer 33 on a first glass baseboard 37, where a support part 31 and the black shielding layer 33 are manufactured by using a same procedure;

a manufacturing procedure of a first color resist layer 341;

a manufacturing procedure of a second color resist layer 342; and a manufacturing procedure of a third color resist layer 343, where specifically, each of the first color resist layer 341, the second color resist layer 342 and the third color resist layer 343 is any one of a red color resistance, a green color resistance and a blue color resistance, and the first color resist layer 341, the second color resist layer 342 and the third color resist layer 343 are different in color;

a manufacturing procedure of a first common electrode 32;

a manufacturing procedure of a spacing unit 35;

a manufacturing procedure of a transparent conductive film 45; and a manufacturing procedure of a first alignment film 36.

Figure 12:
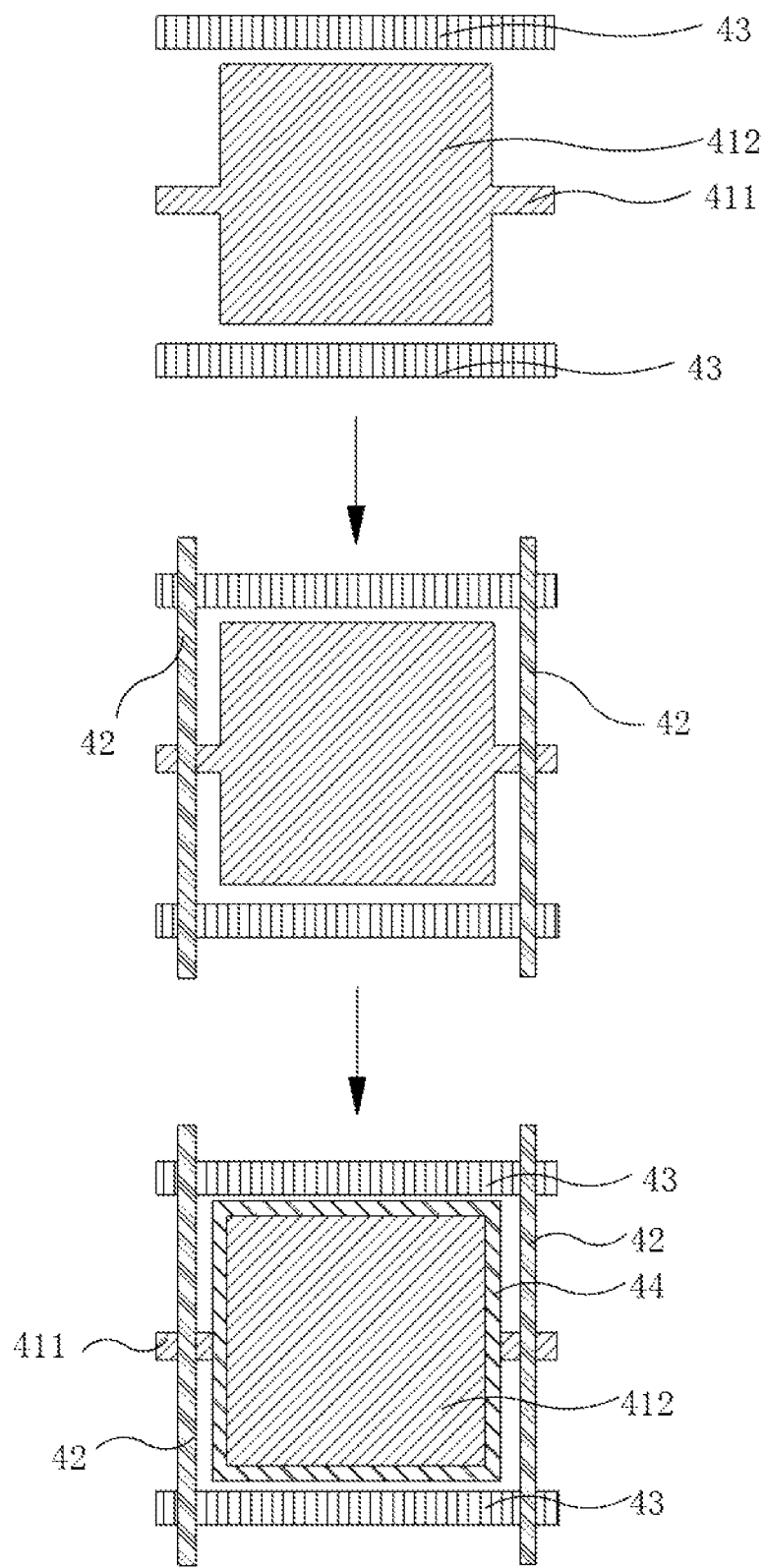
FIG. 12 is a schematic diagram (1) of a manufacturing process of a second substrate according to an embodiment of this application.

Referring to FIG. 12, the manufacturing process of the second substrate 40 includes:

after a metal layer is formed on a second glass baseboard 48 through sputtering deposition, a photomask manufactured according to a design forms a scanning line 43 and a second common electrode 41 after exposure development, and the second common electrode 41 includes a wiring part 411 and a pattern of the second common electrode 41 on a enlarging part 412;

a protective layer 47 is laid on the metal layer after the exposure development;

a data line 42 is formed on the protective layer 47 through sputtering deposition, exposure development, and the like;

a passivation layer 44 is laid on the data line 42, a through via hole 441 is formed on another photomask manufactured according to a design, at a corresponding position on the second common electrode 41 by etching by using au etching machine, and a corresponding via hole 441 is also etched on the protective layer 47; and the second alignment film 46 is printed on the second substrate 40, and an alignment film in an area that is of the display area 10 and in which the support part 31 is disposed is removed by using a particular local alignment film removing machine.

After the manufacturing process of the first substrate 30 and the manufacturing process of the second substrate 40 are completed, the first substrate 30 and the second substrate 40 are sealed and bonded by using a sealant 22.

Figure 13:
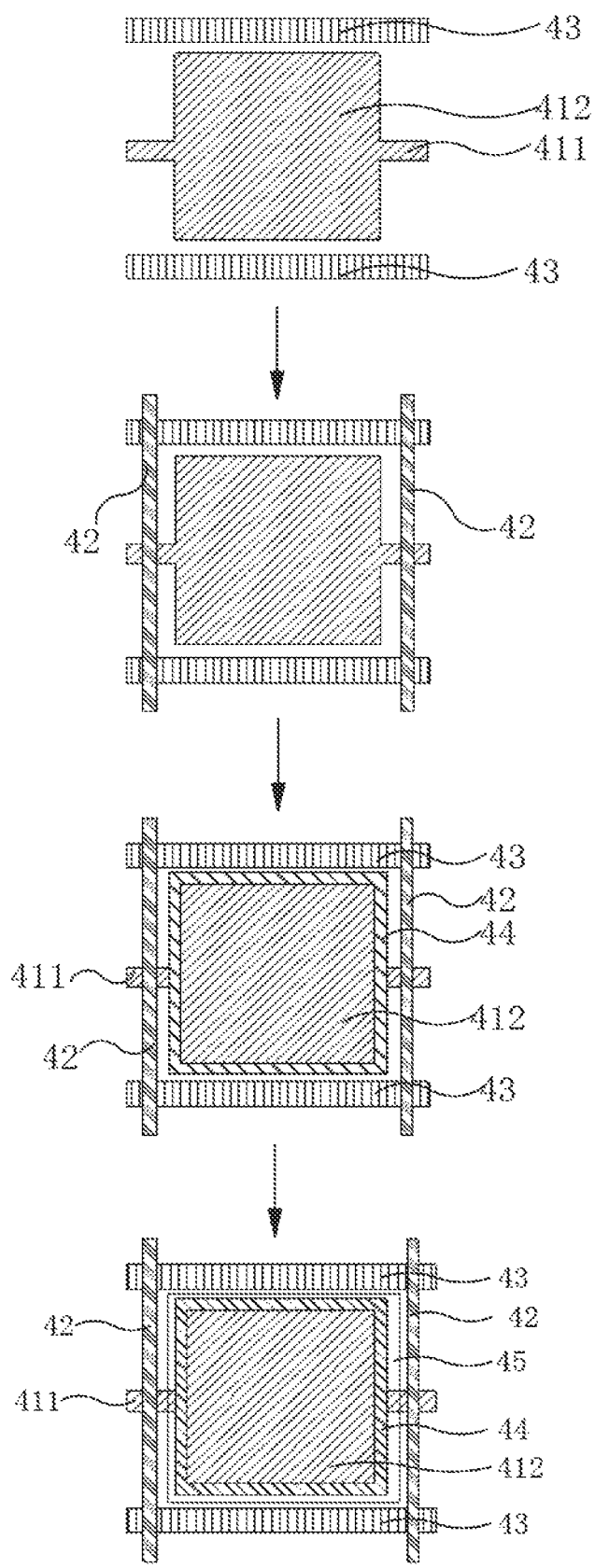
FIG. 13 is a schematic diagram (2) of a manufacturing process of a second substrate according to an embodiment of this application.

Referring to FIG. 13, the manufacturing process of the second substrate 40 further includes:

After a metal layer is formed on a second glass baseboard 48 through sputtering deposition, a photomask manufactured according to a design forms a scanning line 43 and a second common electrode 41 after exposure development, and the second common electrode 41 includes a wiring part 411 and a pattern of the second common electrode 41 on a enlarging part 412;

a protective layer 47 is laid on the metal layer after the exposure development;

a data line 42 is formed on the protective layer 47 through sputtering deposition, exposure development, and the like;

a passivation layer 44 is laid on the data line 42, a via hole 441 is formed on another photomask manufactured according to a design, at a corresponding position on the second common electrode 41 by etching by using an etching machine, and a corresponding via hole 441 is also etched on the protective layer 47;

the transparent conductive film 45 is further formed on the passivation layer 44 through sputtering deposition; and the second alignment film 46 is printed on the second substrate 40 on which the second common electrode 41, the passivation layer 44 and the transparent conductive film 45 are formed, and an alignment film in an area that is of the display area 10 and in which the support part 31 is correspondingly disposed is removed by using a particular local alignment film removing machine; and in addition, an alignment film in an area that is of the first alignment film After the manufacturing process of the first substrate 30 and the manufacturing process of the second substrate 40 are completed, the first substrate 30 and the second substrate 40 are sealed and bonded by using a sealant 22.

Figure 2:
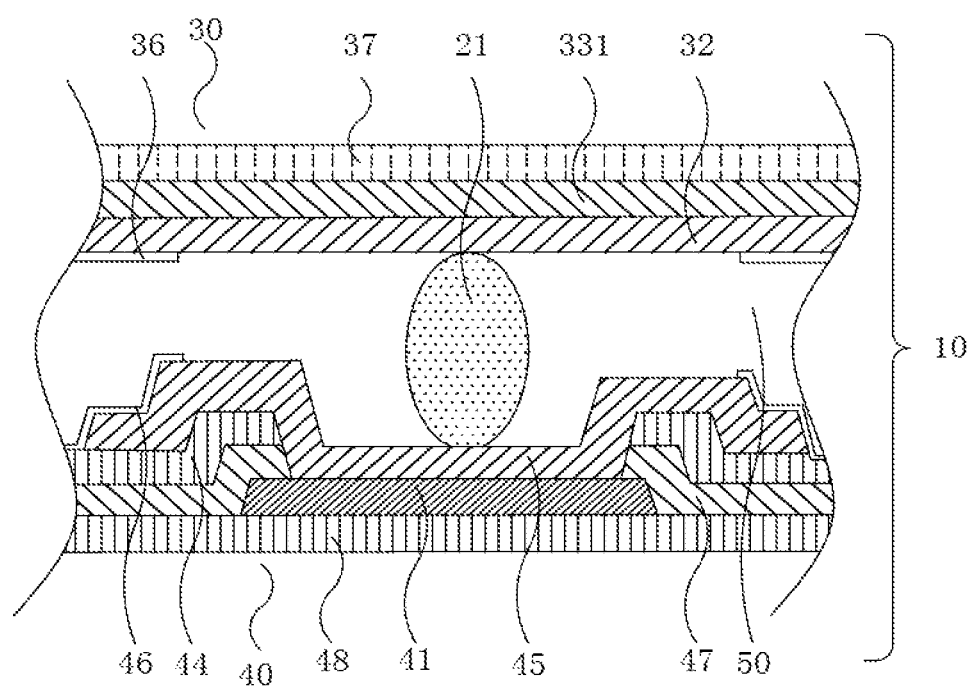
FIG. 2 is a schematic structural diagram (1) of a display panel according to an embodiment of this application.
Figure 3:
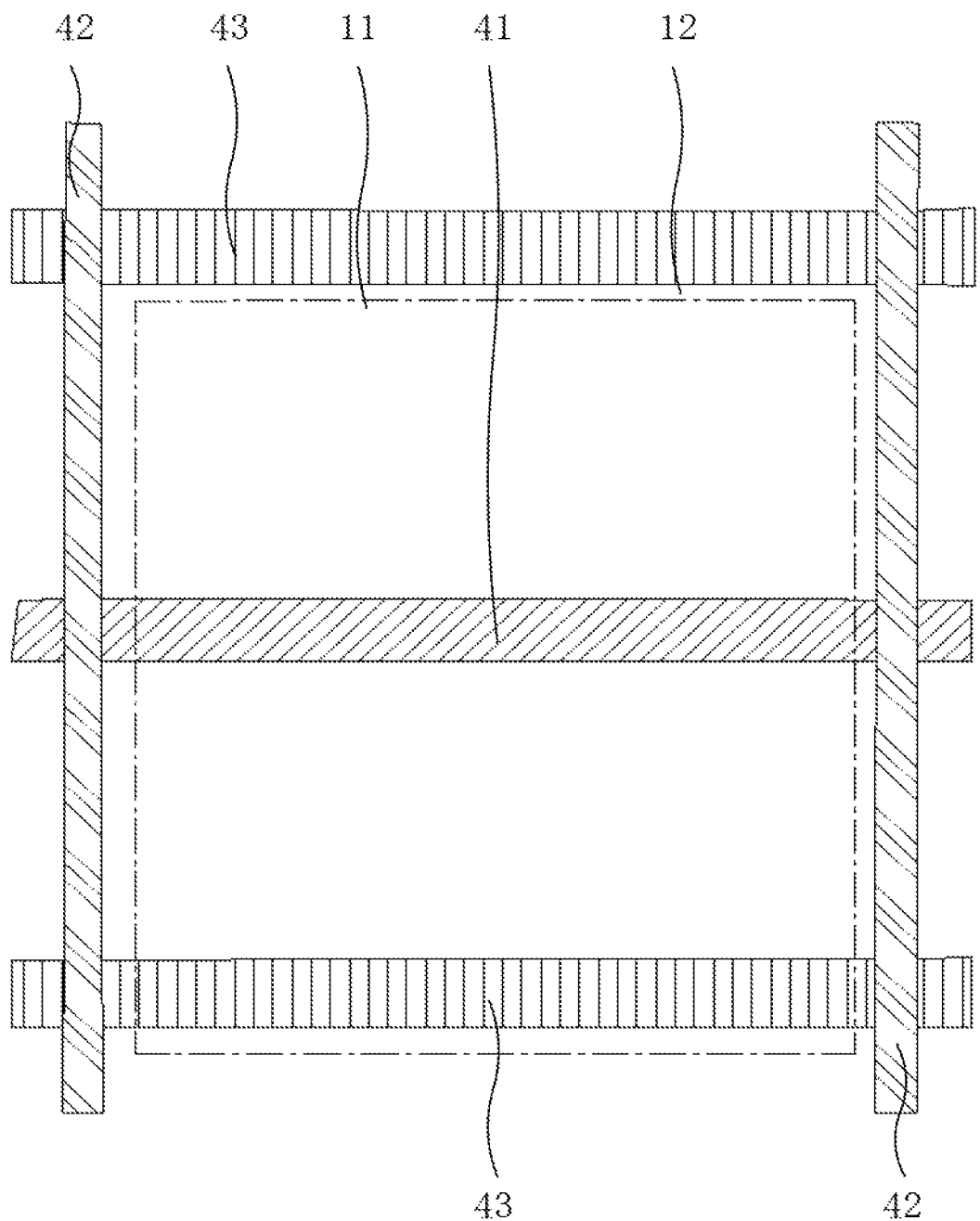
FIG. 3 is a schematic diagram of an exemplary second common electrode.
Figure 4:
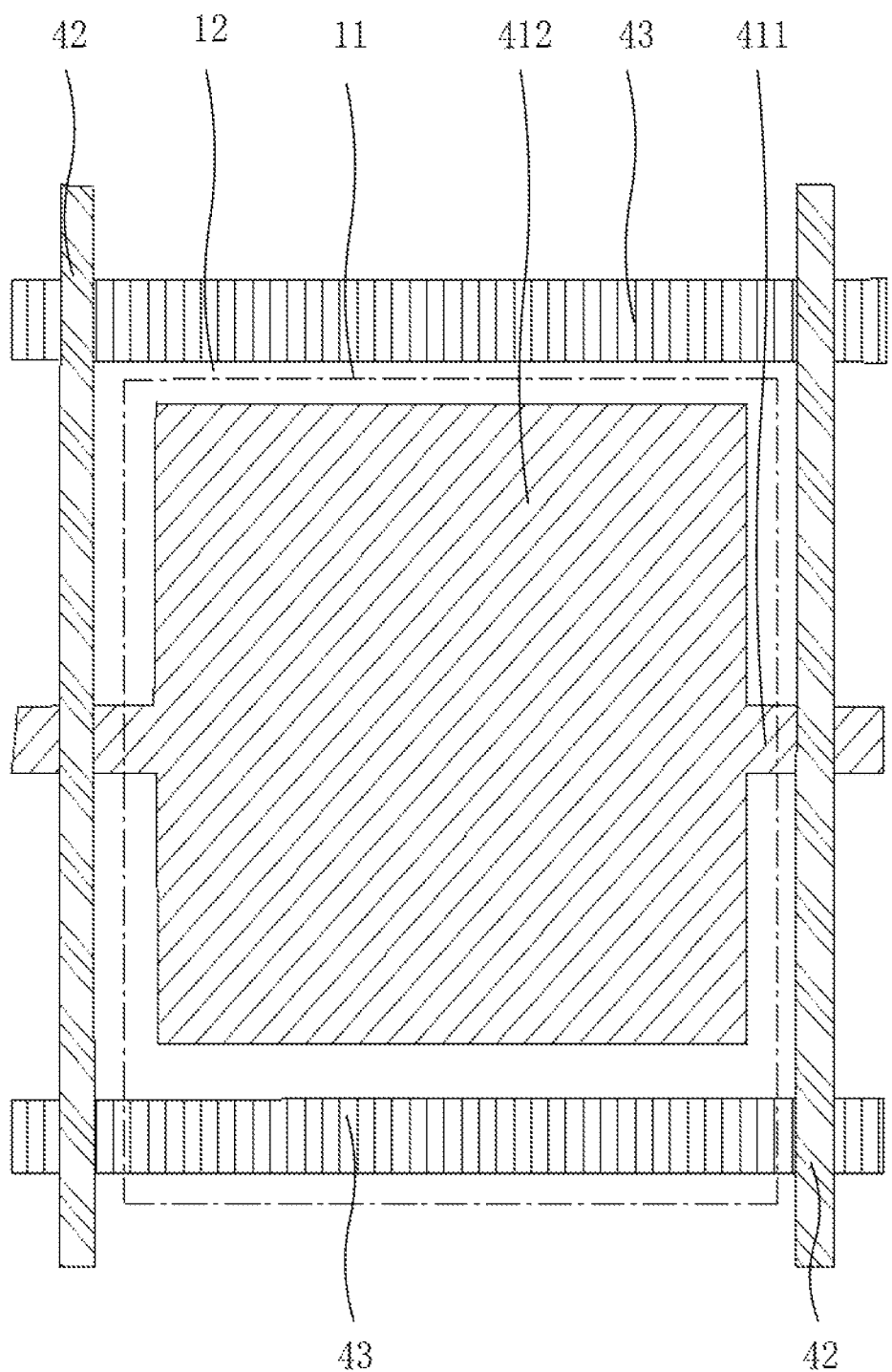
FIG. 4 is a schematic diagram of a second common electrode according to an embodiment of this application.
Figure 5:
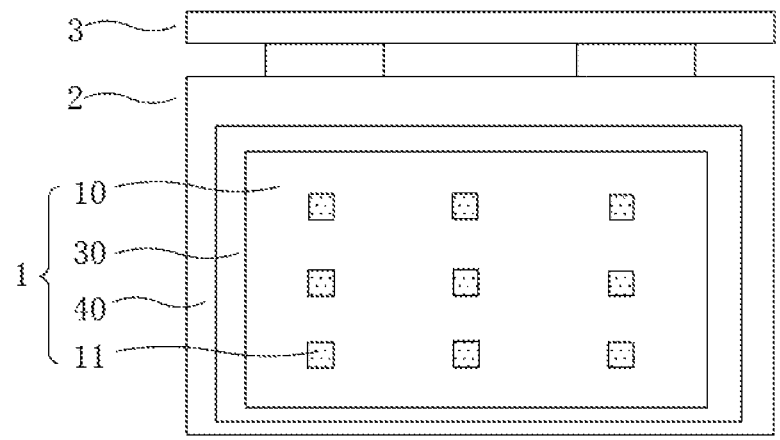
FIG. 5 is a schematic distribution diagram (1) of black pixel areas according to an embodiment of this application.
Figure 6:
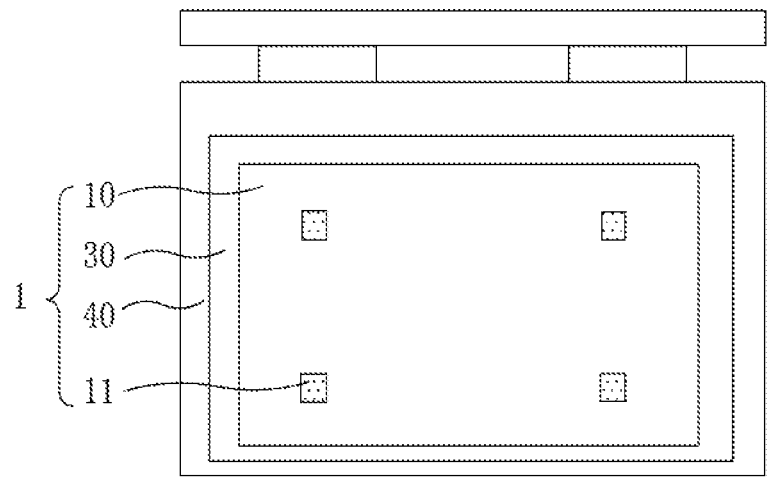
FIG. 6 is a schematic distribution diagram (2) of black pixel areas according to an embodiment of this application.
Figure 7:
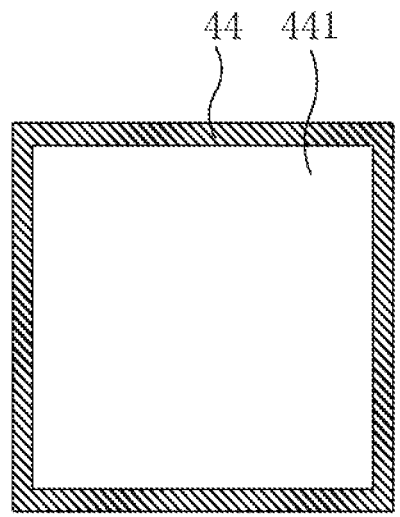
FIG. 7 is a schematic diagram of a passivation layer according to an embodiment of this application.

Different from the foregoing embodiments, referring to FIG. 2, the manufacturing process of the first substrate 30 further includes:

forming a black shielding layer 33 on a first glass baseboard 37;

a manufacturing procedure of a first color resist layer 341;

a manufacturing procedure of a second color resist layer 342;

a manufacturing procedure of a third color resist layer 343, where specifically, each of the first color resist layer 341, the second color resist layer 342 and the third color resist layer 343 is any one of a red color resistance, a green color resistance and a blue color resistance, and the first color resist layer 341, the second color resist layer 342 and the third color resist layer 343 are different in color;

a manufacturing procedure of a spacing unit 35;

a manufacturing procedure of a first common electrode 32; and a manufacturing procedure of a first alignment film 36.

After the manufacturing process of the first substrate 30 and the manufacturing process of the second substrate 40 are completed, conductive metal balls 21 are dispensed in an area that is of the second substrate 40 and in which the support part 31 is disposed, and then, a liquid crystal layer 50 is dripped on the second substrate 40; and the first substrate 30 and the second substrate 40 are sealed and bonded by using a sealant 22.

In another embodiment of this application, a display device 2 is further provided. The display device 2 includes any one of the display panel 1 and a drive circuit 3 for driving the display panel 1.

The display panel of this application may be a TN panel, an in-plane switching (IPS) panel, or a multi-domain vertical alignment (VA) panel, and may certainly be any other suitable type of panel.

The foregoing contents are detailed descriptions of this application in conjunction with specific preferred embodiments, and it should not be considered that the specific implementation of this application is limited to these descriptions. Persons of ordinary skill in the art can further make simple deductions or replacements without departing from the concept of this application, and such deductions or replacements should all be considered as falling within the protection scope of this application.

What is claimed is:

1. A display panel, comprising a display area and a peripheral area, the display panel comprising:
   a first substrate:
   a second substrate, disposed opposite to the first substrate;
   a liquid crystal layer, sandwiched between the first substrate and the second substrate;
   a sealant, arranged in the peripheral area and configured to seal and bond the first substrate with the second substrate;
   a first common electrode, disposed on the first substrate;
   a second common electrode, a passivation layer and a transparent conductive film sequentially disposed on the second substrate;
   a plurality of data lines distributed in parallel at intervals and a plurality of scanning lines distributed in parallel at intervals, wherein the data lines are disposed perpendicular to the scanning lines; and
   a support part, being conductive and electrically connecting the first common electrode to the second common electrode,
   wherein a rectangular area is defined by two data lines next to each other and two scanning lines next to each other, all of the portions of the second common electrode within the rectangular area are two wiring parts each having a constant line width in a plan view and one enlarging part, the two wiring parts are respectively disposed at two sides of the enlarging part and are directly connected to the enlarging part, each of the two wiring parts extends to an outside of the rectangular area, and a line width of the enlarging part is greater than that of each of the wiring parts;
   wherein the transparent conductive film directly contacts the enlarging part through a via hole formed within the passivation layer, each of the enlarging part, the via hole and the transparent conductive film has a rectangular shape in the plan view and overlaps with the support part in the plan view, and the support part directly contacts both the transparent conductive film and the first common electrode; and
   wherein the display area comprises a plurality of black pixel areas evenly distributed in the display area, and the enlarging part is disposed in each of the black pixel areas.

2. The display panel according to claim 1, wherein a black shielding layer is disposed on the first substrate, the black shielding layer comprises a first black shielding layer, and the first black shielding layer is disposed in the corresponding black pixel area.

3. The display panel according to claim 1, wherein the black pixel areas comprise a plurality of support parts, and each of the plurality of support parts is disposed at a position that is at a distance greater than or equal to one thousandth of the horizontal length and the vertical width of the display area to a boundary of the display area in horizontal and vertical directions.

4. The display panel according to claim 1, wherein the support part comprises a conductive metal ball, which is sandwiched between the first common electrode and the second common electrode,
   and the conductive metal ball electrically connects the first common electrode to the second common electrode through the via hole.

5. The display panel according to claim 4, wherein the conductive metal ball is disposed on the transparent conductive film.

6. The display panel according to claim 5, wherein the passivation layer is arranged to closely surround the enlarging part, and the transparent conductive film is arranged to surround the passivation layer.

7. The display panel according to claim 4, wherein the conductive metal ball is arranged in the display area, or in the peripheral area, or in both the display area and the peripheral area.

8. The display panel according to claim 1, wherein the support part is disposed on the first substrate, the first common electrode covers the support part and is electrically connected to the second common electrode through the support part.

9. The display panel according to claim 8, wherein the first substrate comprises a black shielding layer, and the support part and the black shielding layer are manufactured in a same procedure.

10. The display panel according to claim 9, wherein the support part is formed by stacking at least one selected from the group consisting of a black matrix layer, a color photoresist layer, and a spacing unit.

11. The display panel according to claim 8, wherein the first substrate comprises a color photoresist layer, which comprises a first color resist layer, a second color resist layer, and a third color resist layer, and wherein the support part comprises any one of the first color resist layer, the second color resist layer and the third color resist layer or a combination thereof.

12. The display panel according to claim 8, wherein a spacing unit is disposed on the first substrate, and the support part and the spacing unit are manufactured in a same procedure.

13. The display panel according to claim 1, wherein in a manufacturing process of the second substrate, a second alignment film is printed on the second substrate, and a portion of the alignment film in a position of the display area where the support part to be disposed is removed using a local alignment film removing machine.

14. A display device, comprising a display panel and a drive circuit for driving the display panel, wherein the display panel comprises a display area and a peripheral area, the display panel comprising:
   a first substrate:
   a second substrate, disposed opposite to the first substrate;
   a liquid crystal layer, sandwiched between the first substrate and the second substrate;

a sealant, arranged in the peripheral area and configured to seal and bond the first substrate with the second substrate;

a first common electrode, disposed on the first substrate;

a second common electrode, a passivation layer and a transparent conductive film sequentially disposed on the second substrate;

a plurality of data lines distributed in parallel at intervals and a plurality of scanning lines distributed in parallel at intervals, wherein the data lines are disposed perpendicular to the scanning lines; and a support part, being conductive and electrically connecting the first common electrode to the second common electrode, wherein a rectangular area is defined by two data lines next to each other and two scanning lines next to each other, all of the portions of the second common electrode within the rectangular area are two wiring parts each having a constant line width in a plan view and one enlarging part, the two wiring parts are respectively disposed at two sides of the enlarging part and are directly connected to the enlarging part, each of the two wiring parts extends to an outside of the rectangular area, and a line width of the enlarging part is greater than that of each of the wiring parts;

wherein the transparent conductive film directly contacts the enlarging part through a via hole formed within the passivation layer, each of the enlarging part, the via hole and the transparent conductive film has a rectangular shape in the plan view and overlaps with the support part in the plan view, and the support part directly contacts both the transparent conductive film and the first common electrode; and wherein the display area comprises a plurality of black pixel areas evenly distributed in the display area, and the enlarging part is disposed in each of the black pixel areas.

* * * * *